United States Patent [19]
Youl

[11] 4,057,161
[45] Nov. 8, 1977

[54] LIFTING AND HANDLING APPARATUS

[76] Inventor: Gavin Boyce Youl, 57 Clarence Street, Perth 7300, Tasmania, Australia

[21] Appl. No.: 685,621

[22] Filed: May 12, 1976

[30] Foreign Application Priority Data

May 13, 1975  Australia ............................... 1581/75
July 17, 1975  Australia ............................... 2392/75

[51] Int. Cl.² ............................................. E02F 3/00
[52] U.S. Cl. ................................................... 214/777
[58] Field of Search ................... 214/78, 77 P, 77 R, 214/352, 506, 501, 510, 130 R, 130 A, 130 B, 130 C, 131 R, 766, 777, 773, 144

[56] References Cited
U.S. PATENT DOCUMENTS

| 2,491,079 | 12/1949 | Bestland | 214/78 X |
| 2,628,730 | 2/1953 | Speicher et al. | 214/766 |
| 2,660,322 | 11/1953 | Richey | 214/131 |
| 2,671,570 | 3/1954 | Richey | 214/510 |
| 3,877,595 | 4/1975 | Edelman | 214/130 C X |
| 3,974,926 | 8/1976 | Kopaska | 214/352 |

Primary Examiner—Albert J. Makay
Attorney, Agent, or Firm—Graybeal, Barnard & Uhlir

[57] ABSTRACT

Lifting and handling apparatus for use in agriculture, including a frame having ground engaging wheels adjacent one end and being connectable to a tractor or other prime mover at its other end. A load support cradle is connected to the frame and comprises a base section and a back section which is upstanding from a rear edge portion of the base section. The cradle is connected to the apparatus frame through a linkage system so as to be movable relative to the frame between a loading position in which it projects beyond the end of the frame adjacent the wheels, and a carrying position in which it is located above the frame. Drive means attached to the frame is operable to cause the aforementioned movement. The linkage system includes articulated links on both sides of the frame which interact between the frame and cradle so as to cause automatic lifting and tilting of the cradle during its movement from the loading position to the carrying position. The arrangement is such that in the loading position, the base section is substantially horizontal, and in the carrying position both the base and back sections slope relative to the horizontal and the junction between those sections is located between a vertical plane containing the wheel axle and the connection with the tractor or other prime mover.

5 Claims, 9 Drawing Figures

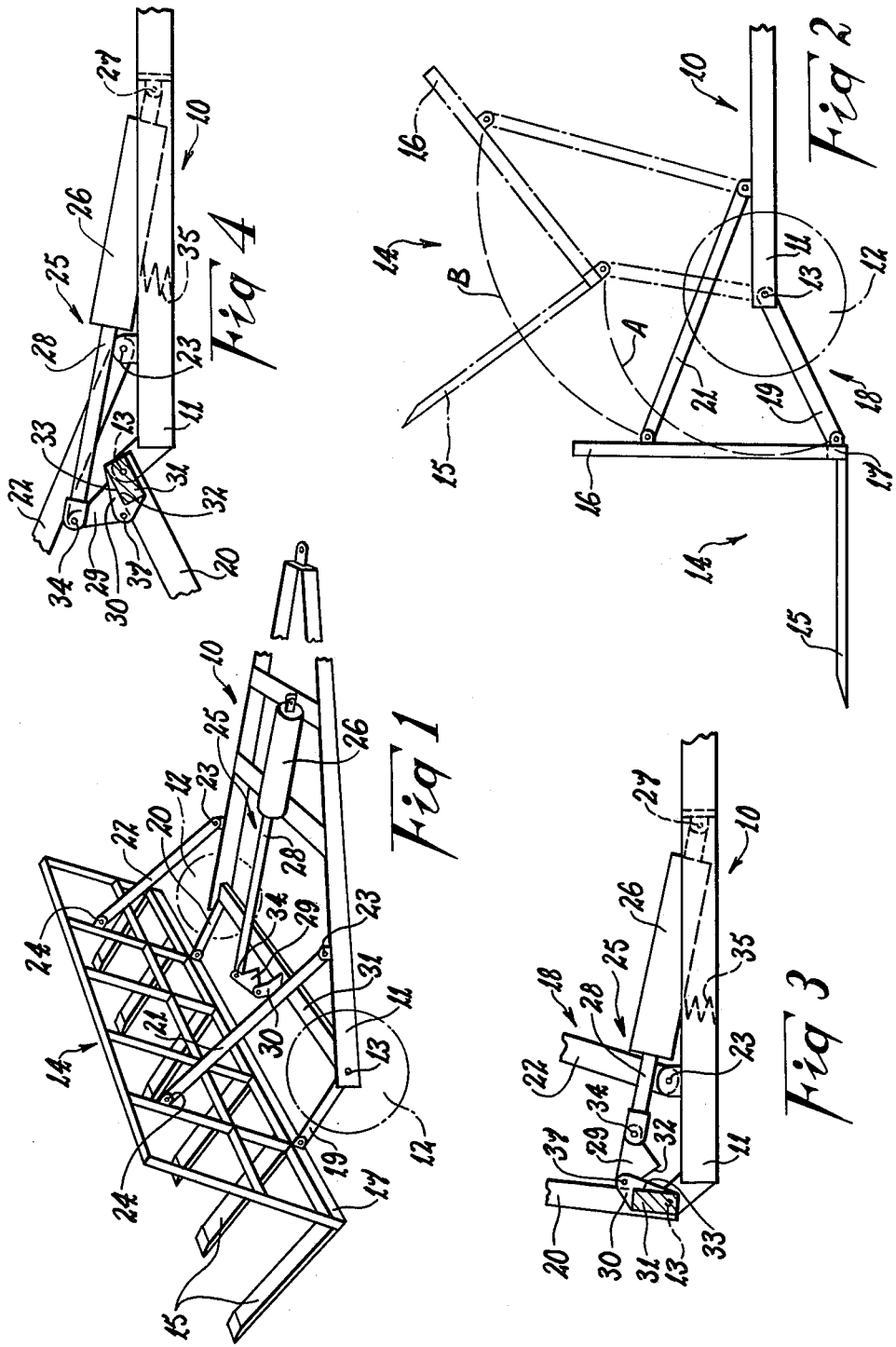

U.S. Patent  Nov. 8, 1977  Sheet 2 of 2  4,057,161
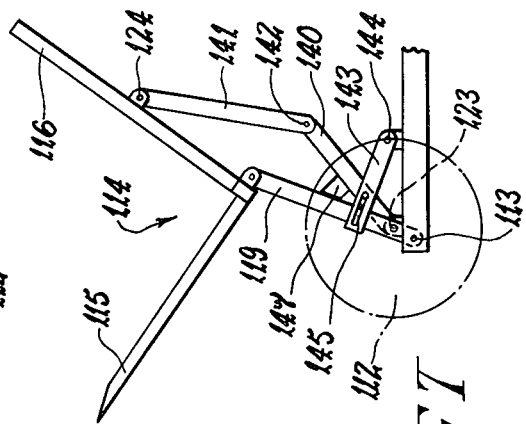
Fig 7
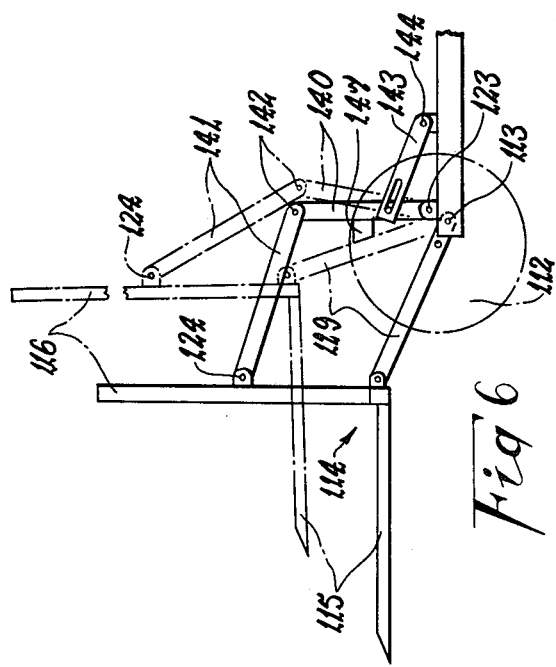
Fig 6
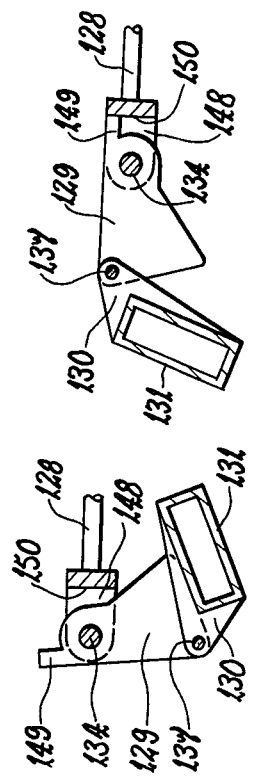
Fig 9
Fig 8
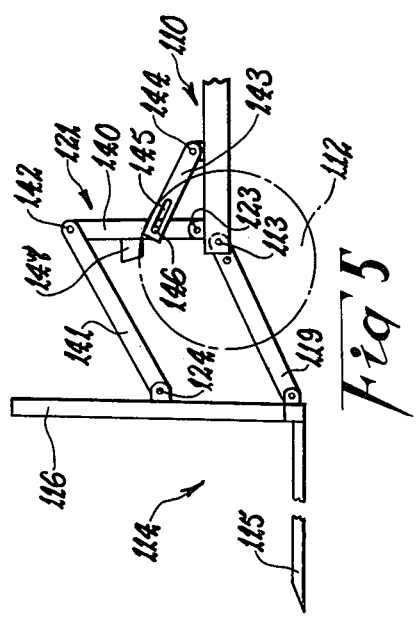
Fig 5

LIFTING AND HANDLING APPARATUS

This invention relates to lifting and handling apparatus and is particularly applicable for agricultural uses such as for lifting and transporting of haystacks although the invention is applicable to other fields and uses such as the lifting of timber, pipes or other loads.

One known arrangement of a trailer for lifting and transporting haystacks has a chain elevator which is progressively pushed under the stack and the chain elevator draws the stack onto the trailer. However, this arrangement is relatively expensive and cumbersome.

It has also been known to lift relatively small haystacks by means of forklift arrangements. The forks are formed under the stack and the stack is then lifted vertically to about one foot above the ground. In moving a stack carried by such an arrangement there is a tendency for the stack to bounce off the forks if the stack is not tied to the forks.

An object of the present invention is to provide a relatively simple and effective lifting and handling apparatus.

According to one aspect of the present invention, there is provided lifting and handling apparatus including; a frame having ground engaging means, at least part of which is located adjacent one end of said frame; load support means; connecting means mounting said load support means on said frame so that said load support means is movable relative to said frame between a loading position in which it projects beyond said one end of the frame, and a carrying position in which it is located above said frame, said connecting means being arranged so that, in said carrying position, the downward thrust transferred through said connecting means from said load support means to said frame, does not produce a turning moment about the zone of engagement between said ground engaging means and the ground which is located nearest said one end of the frame, or produces a turning moment having substantially zero effect about said zone or having its line of force on the same side of said zone as the end of said frame opposite said one end; and drive means for moving said load support means between the two said positions.

According to another aspect of the invention, there is provided lifting and handling apparatus including; a frame having ground engaging means, at least part of which is located adjacent one end of said frame and is attached to said frame through a mounting permitting rotation of said ground engaging means or said part thereof, relative to said frame; load support means; connecting means mounting said load support means on said frame so that said load support means is movable relative to said frame between a loading position in which it projects beyond said one end of the frame, and a carrying position in which it is located above said frame; said connecting means being arranged so that, in said carrying position, the downward thrust transferred through said connecting means from said load support means to said frame, does not produce a turning moment about the rotational axis of said ground engaging means mounting, or produces a turning moment having substantially zero effect about said rotational axis or having its line of force on the same side of said rotational axis as the end of said frame opposite said one end; and drive means for moving said load support means between the two said positions.

The reference to downward thrust in the two preceding passages is intended to refer to the load applied to the main frame by virtue of the overhead position of the load support means, and there will be such an applied load regardless of whether or not material is located on the load support means, because of the inherent weight of that means. It is to be further understood that "substantially zero effect" means that there may be a turning moment but its affect on the equilibrium of the apparatus is negligible. That is, if there is a turning moment tending to tip the frame downwards at the aforementioned "one end" of the frame, its influence will be substantially counter-balanced by the mass of the apparatus on the other side of the wheel axis. Furthermore, the "line of force" referred to in the preceding paragraph refers to the line along which the thrust acts — i.e., it is a line passing vertically downwards from the center of gravity of the applied load.

The following description refers in more detail to these essential features and further optional features of the invention. To facilitate an understanding of the invention, reference is made to the accompanying drawings where these features are illustrated in preferred form. It is to be understood however, that the essential and optional features of the invention are not limited to the specific forms of these features as shown in the drawings.

In the drawings:

FIG. 1 is a perspective view of the embodiment of the invention shown in semi-diagrammatic form;

FIG. 2 is a diagrammatic side elevational view of the embodiment shown in FIG. 1, and which shows the apparatus in each of its two operational positions;

FIG. 3 is an enlarged view of the drive mechanism of the embodiment of FIG. 1, showing that mechanism in the carrying position of the apparatus;

FIG. 4 is a view similar to FIG. 3 but showing the drive mechanism at the loading position of the apparatus;

FIG. 5 is a view similar to FIG. 2 but showing a second embodiment of the invention;

FIG. 6 is a view similar to FIG. 5 but showing the apparatus at positions intermediate the loading and carrying positions;

FIG. 7 is a view similar to FIG. 6 but showing the apparatus in the carrying position;

FIG. 8 is an enlarged view of the drive mechanism of the embodiment of FIG. 5, and showing that mechanism in the loading position of the apparatus;

FIG. 9 is a view similar to FIG. 8 but showing the drive mechanism in the carrying position of the apparatus.

The lifting apparatus shown in FIGS. 1 to 4 of the drawings includes a frame assembly 10 having a pair of ground engaging wheels 12 adjacent a rear end 11 of the frame 10, but other ground engaging means such as tracks could be used. The front end of the frame assembly 10 may be arranged for attachment to the draw bar or other coupling of a prime mover such as a tractor. In an alternative arrangement not shown however, the apparatus may be self-propelled rather than drawn by a separate prime mover. The frame assembly 10 may be generally triangular in plan as shown in FIG. 1, having the ground engaging means 12 mounted on an axle 13 extending across the base of the triangle. If desired, the frame assembly 10 may also include front ground engaging wheels, and that will be necessary if the apparatus is to be self-propelled.

The apparatus also includes load support means 14 which is connected to the frame 10 so as to be movable between a lowered loading position and a raised carrying position, which are respectively shown in full and broken line in FIG. 2. The load support means 14 comprises a cradle-like member and includes a base section 15 which is generally horizontal when the cradle 14 is in its loading position as shown in full line in FIG. 2. If desired, the base section 15 may be movable beyond a horizontal attitude to adopt a downwardly inclined attitude for downhill uses, and in that event stop means (not shown) may be provided to limit the downward inclination of the base section 15. In the preferred form shown, the base section 15 comprises a plurality of generally parallel and laterally spaced forks or tines secured to a transverse beam 17 so as to extend generally rearwardly of the frame assembly 10. In an example construction, the transverse beam 17 may be about 15 feet long, and the forks 15 may be about 8 feet long.

The cradle 14 also includes a back section 16 which is generally upright when the cradle 14 is in its loading position as shown in broken line in FIG. 2. The back section 16 preferably comprises a rigid grid or frame secured to the transverse beam 17 and extending upwardly therefrom, and arranged angularly relative to the forks 15 (e.g. substantially at right angles) so that when the cradle 14 is in its carrying position, the base section 15 and back section 16 define a load retaining channel between them. As previously stated, the forks 15 and back section 16 are preferably substantially at right angles, and in the carrying position they are preferably each at about 45° to the horizontal, but that is not essential — e.g., the forks 15 could be at an angle of approximately 20° to the horizontal.

In the carrying position, the cradle 14 is located substantially directly over, or forwardly of, the axis of the ground engaging wheels 12 so as to produce either a substantially zero turning moment about that axis, or a turning moment tending to push the forward end of the frame 10 downwards. In particular, the centre of gravity of the cradle 14, whether loaded or unloaded, should not be any substantial distance rearward of the axis of wheels 12, as that may have the affect of upsetting the equilibrium of the apparatus such as to throw substantial strain on the towing vehicle. It is therefore preferred that the centre of gravity, and consequently the line of thrust, of the load, is located slightly forward of the axis of wheels 12. Stop means may be provided to determine the forwardmost position of the load support cradle 14.

The disposition of the cradle 14 is controlled by connecting means 18 which pivotally connects the cradle 14 to the frame assembly 10, and movement of the cradle 14 is regulated by suitable drive means 25. The pivotal connecting means 18 is arranged to cause the cradle 14 to move forwardly of the frame 10 as it is lifted into the carrying position.

In the construction shown, the connecting means 18 comprises a primary linkage which is made up of two arms 19 and 20, and a control linkage made up of two arms 21 and 22. The arm of each linkage is located adjacent each of the two opposite sides of the frame 10, and each of the four arms is pivotally connected at its opposite ends respectively to the frame 10 and the cradle 14. The axis of each pivot is substantially parallel to that of the wheels 12, and in the particular arrangement shown the pivotal connection between the arms 19 and 20 and the frame 10, is coaxial with the wheels 12. That is, each of the arms 19 and 20 is arranged to swing about the wheel axis 13. Each of the primary arms 19 and 20 is connected to the cradle 14 at or adjacent the junction between the sections 15 and 16, and in the loading position provides a rigid support column for the cradle 14. The control arms 21 and 22 are connected to the back section 16 remote from the aforementioned junction and are connected to the frame 10 forwardly of the wheels 12. Thus, the arms 21 and 22 serve to control the disposition of the cradle 14 during its movement between the two operative positions, and because of their greater length as compared with the primary arms 19 and 20, the cradle 14 is caused to tilt during its movement as shown in FIG. 2.

The drive means 25 is preferably fluid (e.g., hydraulic) operated piston-cylinder assembly as shown, and is coupled to the aforementioned connecting linkage for moving the load cradle 14 between its operative positions. In the arrangement shown, the drive assembly 25 includes a cylinder 26 pivotally connected at 27 to the frame 10, and a ram 28 pivotally connected to the primary arms 19 and 20. The last mentioned connection is preferably effected through a drive lever 29 having one end pivotally connected at 34 to the ram 28 and having its other end pivotally connected at 37 to an arm 30 fixed to and extending laterally from a member 31 extending between and interconnecting the arms 19 and 20.

As best seen in FIGS. 3 and 4, stop means is provided to prevent pivotal movement of the drive lever 29 relative to the arm 30, beyond the position at which the cradle 14 is in its loading position, and in that position the drive lever 29 is preferably substantially upright so enabling sufficient torque to be produced by the drive means 25 when lifting relatively heavy loads. By way of example, haystacks of about 3 tons may be lifted with the preferred apparatus of the present invention. The stop means as shown, comprises a shoulder 32 on the drive lever 29 which is engageable with a surface 33 of the member 31 when the drive lever 29 and arm 30 are arranged in the loading position (see FIG. 4).

As the load support cradle 14 is lifted from the loading position, the drive lever 29 is progressively moved closer to alignment with the line of action of the ram 28 by virtue of its pivotal movement relative to the arm 30, so that the force of the ram 28 is substantially along the longitudinal axis of the drive lever 29 and substantially the entire lifting torque is applied through the arm 30. In order that the cradle 14 can be returned from the carrying position to the loading position without falling freely during part of that movement, the pivot 34 is preferably maintained substantially on a straight line joining the pivots 37 and 27, at least during that time that the shoulder 32 and surface 33 are disengaged (see FIG. 3). That relationship may be achieved by having the hydraulic cylinder 26 substantially horizontal with its end remote from the pivot 27 biased downwardly towards the frame 10, for example by a spring 35 extending between the frame 10 and the cylinder 26. As the ram 28 is extended, the drive lever 29 swings about both the pivots 34 and 37 until the shoulder 32 and surface 33 engage, and during further movement the arm 30 and drive lever 29 act as a single rigid lever.

Another embodiment is shown in FIGS. 5 to 9 of the drawings, and as a matter of convenience similar reference numerals will be used to identify parts of that embodiment corresponding to parts of the previous embodiment, except that for the second embodiment the reference numerals will be in the series 100 to 199.

The basic aim of this second embodiment is to achieve an arrangement in which the base section 115 of the cradle 114 can be maintained substantially horizontal for part of the lifting movement from the previously described loading position, whereby the apparatus can be used to unload and load trucks, trailers, and other raised supports. In the particular embodiment shown, that aim is satisfied by modifying the two control arms 121 and 122 so that each is formed of two sections 140 and 141 which are arranged end to end and have their adjacent ends pivotally connected at 142. Each control arm 120 and 121 is arranged to guide an upper portion of the back section 116 through an arc about the axis 142 during a first part of the lifting movement of the cradle 114, and to guide that upper portion through a second arc about the pivot 123 during a second part of lifting movement.

Each upper section 141 of the two arms 120 and 121 is pivotally connected at 124 to the upper portion of the back section 116, as in the previous embodiment. Each lower section 140 is pivotally connected to the frame assembly 110 at 123, which pivot is preferably spaced a short distance forwardly of the wheel axle 113. Also, each lower section 140 is preferably substantially upright during the first part of the lifting movement, as shown in FIGS. 5 and 6, and each upper section 141 is preferably about the same length as the primary arms 119 and 120 and substantially parallel thereto during the aforementioned first part movement. The arrangement is such that, during the first part of the lifting movement, the support base section 115 is maintained generally horizontal as shown in FIGS. 5 and 6. As a result, the base section 115 may be lifted through several feet whilst retaining a loading position to enable the apparatus to perform some functions of an industrial fork-lift truck such as loading and unloading of tray trucks.

Each of the lower arm sections 140 may be maintained substantially upright during the first part movement by a bracing link 143 extending from a pivotal connection 144 with the frame assembly to an intermediate portion of the arm section 140. The bracing link 143 is provided with a longitudinal slot 145 in which a pin 146 slidably engages, and the pin 146 is secured to the arm section 140. During the first part of the lifting movement, the weight of the cradle 114 tends to draw the arm sections 140 towards the rear of the frame assembly 110, but the sections 140 are held upright by each pin 146 engaging the upper end of the respective slot 145.

In the particular arrangement shown, each arm section 140 is provided with a rearwardly projecting abutment 147 which is engaged with the adjacent arm 119 or 120 during the second part of the lifting movement of the load support cradle 114 — i.e., from the uppermost position shown in FIG. 6, or thereabouts, to the position shown in FIG. 7. Each abutment 147 engages with the arm 119 or 120 at or near the upper limit of the first part movement, so that upon further upward movement of the arms 119 and 120, the arm sections 140 are caused to swing about their pivots 123, and each pin 146 slides along its associated slot 145. Thus, during the second part of the lifting movement, the load support carrier is caused to tilt forwardly to adopt the carrying position. The forward limit of the load carrying position may be determined by when the pin 146 engaging the lower end of their respective slots 145.

In returning the load support cradle 144 to its lowered position as shown in FIG. 5, it will be appreciated that the various components operate in the reverse manner to that described above.

The drive means for the apparatus of the FIG. 5 embodiment may be substantially the same as previously described. It is preferred however, that the biasing spring 35 is omitted. Also, the outer end of the ram 128 preferably has a U-shaped clevis 148 attached thereto which receives the adjacent end of the drive lever 129 and the pivot pin 134 extends through it and the lever 129. The drive lever 129 may be provided with a lug 149 which is generally upstanding when the load supporting cradle 114 is in its loading position and is arranged so that, as the hydraulic cylinder draws the drive lever 129 forwardly, the lug 149 approaches the base 150 of the clevis 148. When the lug 149 is engaged with the clevis base 150, the ram 128 and drive lever 129 act like a single rigid member both during raising and lowering of the cradle 114 and thereby obviates the necessity for a biasing spring such as used in the FIG. 1 embodiment.

In an arrangement of the load support cradle which is not shown, the connecting linkages and the drive means are mounted on a turntable which is rotatably mounted on the frame assembly. With this arrangement (which is applicable to either of the described embodiments) when the load support cradle is in its carrying position, it can be rotated through 90°, or other suitable angle, to reduce the overall width of the apparatus. This is particularly desirable if the apparatus is to be moved through relatively narrow gateways or along public carriageways. Alternatively or in addition, in the carrying position, the lowest portion of the load support cradle (i.e., the transverse beam) is located higher than most fences, and is therefore preferably at least 4 feet 6 inches above ground. Thus, the frame assembly can pass through gateways while the lateral extremities of the load support cradle pass over the fencing on either side of the gateways.

In either embodiment described, a discharging conveyor (not shown) may be pivotally mounted along the upper portion of the support back section and arranged to rest on a load in the carrying channel under its own weight. With this arrangement when there is a load of hay in the cradle, the conveyor is activated to draw hay from the top of the load and discharge the same from one side of the cradle. Thus manual distribution of hay for feeding cattle for example becomes unnecessary with this arrangement.

The control arms of the connecting linkage may be adjustable in length so that optimum loading and carrying orientations of the load support cradle can be achieved for different tractor draw bar heights. Also if desired the control arms, or part thereof, may be replaced by hydraulic rams pivotally connected at respective ends to the frame assembly and back section of the cradle. Such hydraulic rams may act as rigid links during raising and lowering of the load support cradle, but when the cradle is in its raised carrying position the hydraulic rams may be extended to tip the load off the cradle. This arrangement may be useful for loading trucks or filling an above-ground container such as a storage bin.

The embodiment of FIGS. 5 to 9 can be arranged to permit variation of the disposition of the arms 140 in the loading position of the apparatus. That is, those arms may be tilted to one side or the other of the vertical, as desired, and the degree of tilting can be selected to suit requirements. Such adjustment can be effected by employing interchangeable links 143 having different lengths and/or slots 145 of different lengths. Alternatively, the effective length of the slot 145 may be adjustable by adjusting the length of the associated link or by adjusting the position of a stop which protrudes into the slot.

In yet another variation which is not shown, the load support cradle may be detachably mounted on a sub-frame which in turn is pivotally or otherwise connected to the main frame assembly. With this arrangement a load of hay could be left in a field in the cradle which is supported on stilts, and the sub-frame and main frame assembly can be moved elsewhere for use. Cattle could feed from the load support means through spaces between the forks and back section.

The invention has been particularly described with reference to apparatus having ground engaging wheels, but the ground support can be effected in several different ways. For example, the frame may be supported by at least two articulated track assemblies, tandem wheel assemblies, or sledge or slide runners, which are located at respective opposite sides of the frame. In those example arrangements, there will be a plurality of zones of engagement between the ground and each frame support means, and the zone of engagement closest the rear end of the frame may define the critical axis about which the previously discussed turning moment acts. Generally, each articulated track or tandem wheel assembly will be mounted on the frame for limited rotational or rocking movement, and the axis of that mounting will be the critical axis, at least throughout the range of allowable relative movement. If the facility for such relative movement is exhausted or prevented, or the track or wheel assembly is rigidly mounted on the frame, the critical axis will of course be at a zone of engagement with the ground.

In the constructions shown in the drawings, when the load support means is in the carrying position, the junction of the back and base sections of that means is located forwardly of a vertical plane containing the rearmost zone of engagement between the apparatus and the ground — i.e., in the apparatus shown, that vertical plane contains the axis of the ground engaging wheels. That "forward" location of the junction then places the junction between the aforementioned plane and the connection between the apparatus and a tractor. The center of mass of the actual load however, may be slightly rearward of that junction in a typical situation, and the general aim is to have the forward disposition of the junction such that the center of mass is located substantially directly above the axis of the wheels, or slightly forward of that axis.

It will be understood that various minor alterations and modifications may be made to the invention as hereinbefore described without departing from the scope of the invention as defined by the appended claims.

Having now described my invention, what I claim as new and desire to secure by Letters Patent is:

1. Lifting and handling apparatus including:
   a frame having ground engaging means, at least part of which is located adjacent one end of said frame, said part including a pair of ground engaging wheels, each wheel having its axis of rotation located substantially the same distance from said one end of the frame;
   load support means comprising a base section and a back section which is secured to and is upstanding from a rear edge portion of said base section;
   linkage means connecting said load support means on said frame so that said load support means is movable relative to said frame between a loading position in which it projects beyond one end of said frame, and a carrying position in which it is located above said frame; and
   drive means connected to said frame and to said load support means, and being operable to cause movement of said load support means between said loading and carrying positions;
   said linkage means including a primary linkage which is pivotally connected to said frame and to said load support means adjacent the junction between said base and back sections, and a control linkage which is pivotally connected to said frame and to said back section, each of said pivotal connections having its axis substantially parallel to said wheel axis, and the frame connection of said control linkage being located further from said one end of the frame than is the frame connection of said primary linkage;
   each said linkage means including two arms, each of which is located adjacent a respective opposite side of said frame, each said control linkage arm comprising an upper section connected to said load supporting means and a lower section connected to said frame, said arm sections being arranged in end to end relationship and being pivotally connected at their adjacent ends, the said upper arm section being of substantially the same length as each of said primary linkage arms; and restraining means acting between each said lower arm section and said frame during a first part of the movement of said load support means from said loading position, whereby said lower arm sections are held stationary relative to said frame, and being arranged to have no influence on said lower arm section during a second part of said movement from said loading position;
   said linkage means interacting between said frame and said load support means so as to automatically cause lifting and tilting of said load support means during said movement thereof from said loading position to said carrying position, whereby in said loading position said base section is substantially horizontal so as to be adapted to receive a load thereon, and in said carrying position both said base and back sections slope relative to the horizontal to define a load retaining channel between them, and the junction of said base and back sections is located above and forwardly of the zone of engagement between said ground engaging means and the ground which is located nearest said one end of the frame.

2. Apparatus according to claim 1, wherein said second part of the movement continues to said carrying position and said load support means is caused to tilt during that second part, and during said second part each said primary linkage arm abuts a lateral projection of the adjacent said lower arm section so as to retain those members in predetermined relationship.

3. Apparatus according to claim 1, wherein said restraining means includes a bracing link pivotally connected at one end to the frame and being connected at its opposite end portion to a respective lower arm section through a pin and slot arrangement.

4. Apparatus according to claim 1, wherein said drive means includes a piston-cylinder assembly pivotally connected at its opposite ends respectively to said frame and to a drive arm rigidly secured to said primary linkage so as to move therewith, said piston-cylinder assembly being pivotally connected to said drive arm through a lever which is pivotally connected at its opposite ends respectively to said drive arm and said assembly, and said lever having an abutment engageable with part of said drive arm when said load support means is in said loading position, so as to prevent movement of said load support means beyond that position.

5. Apparatus according to claim 4, wherein stop means acts between said lever and said piston-cylinder assembly when said load support means is in said carrying position, so as to retain said lever in a predetermined position relative to said assembly.

* * * * *

UNITED STATES PATENT OFFICE
CERTIFICATE OF CORRECTION

Patent No. 4,057,161            Dated November 8, 1977

Inventor(s) Gavin Boyce Youl

It is certified that error appears in the above-identified patent and that said Letters Patent are hereby corrected as shown below:

Column 5, line 67, change "144" to --114-- .

Signed and Sealed this

Eleventh Day of April 1978

[SEAL]

Attest:

RUTH C. MASON
Attesting Officer

LUTRELLE F. PARKER
Acting Commissioner of Patents and Trademarks